United States Patent
Varga et al.

(10) Patent No.: US 12,218,827 B2
(45) Date of Patent: Feb. 4, 2025

(54) SYSTEMS AND METHODS FOR AVOIDING DUPLICATE DELIVERY IN THE RESET MECHANISM OF SEAMLESS REDUNDANCY (OF TSN/DETNET)

(71) Applicant: Telefonaktiebolaget LM Ericsson (publ), Stockholm (SE)

(72) Inventors: Balázs Varga, Budapest (HU); János Farkas, Kecskemét (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 256 days.

(21) Appl. No.: 17/909,783

(22) PCT Filed: Mar. 12, 2021

(86) PCT No.: PCT/EP2021/056309
§ 371 (c)(1),
(2) Date: Sep. 7, 2022

(87) PCT Pub. No.: WO2021/180911
PCT Pub. Date: Sep. 16, 2021

(65) Prior Publication Data
US 2023/0300064 A1 Sep. 21, 2023

Related U.S. Application Data

(60) Provisional application No. 62/989,305, filed on Mar. 13, 2020.

(51) Int. Cl.
*H04L 45/24* (2022.01)
*H04L 47/32* (2022.01)
*H04L 47/34* (2022.01)

(52) U.S. Cl.
CPC .............. *H04L 45/24* (2013.01); *H04L 47/32* (2013.01); *H04L 47/34* (2013.01)

(58) Field of Classification Search
CPC .......... H04L 45/24; H04L 47/32; H04L 47/34
See application file for complete search history.

(56) References Cited

U.S. PATENT DOCUMENTS

| 5,086,428 A | 2/1992 | Perlman et al. |
| 7,158,491 B1 | 1/2007 | Le |

(Continued)

FOREIGN PATENT DOCUMENTS

| CN | 105009498 A | 10/2015 |
| CN | 106911436 A | 6/2017 |

(Continued)

OTHER PUBLICATIONS

Huawei, et al., "S2-1812087: update to Solution#3 and Solution#4," 3GPP SA WG2 Meeting #129Bis, Nov. 26-30, 2018, West Palm Beach, Florida, 13 pages.

(Continued)

*Primary Examiner* — Eunsook Choi
(74) *Attorney, Agent, or Firm* — Withrow & Terranova, PLLC

(57) ABSTRACT

Systems and methods for avoiding duplicate delivery in the reset mechanism of seamless redundancy, e.g., of a Time Sensitive Networking (TSN) network or Deterministic Networking (DetNet) network, are disclosed herein. In one embodiment, a method performed by a receiving node comprises receiving packets from multiple streams from a transmitting node via a network, each being a replication of a particular packet stream and each packet comprising a sequence indication. The method further comprises performing an elimination procedure, wherein performing the elimination procedure comprises resetting one or more parameters utilized by the elimination procedure responsive to an occurrence of an event while receiving the packets and, responsive thereto, discarding all of the received packets processed by the elimination procedure from a time at which (Continued)

the elimination procedure was reset until an end of a defined period of time.

22 Claims, 10 Drawing Sheets

(56) References Cited

U.S. PATENT DOCUMENTS

| | | | |
|---|---|---|---|
| 7,571,343 | B1 | 8/2009 | Xiang et al. |
| 8,135,006 | B2* | 3/2012 | Walter ............... H04L 45/24 370/389 |
| 8,144,711 | B1* | 3/2012 | Pegrum ............... H04L 45/24 370/428 |
| 2011/0051727 | A1* | 3/2011 | Cai ..................... H04L 45/24 370/390 |
| 2012/0201123 | A1* | 8/2012 | Pegrum ............... H04L 49/25 370/355 |
| 2015/0295635 | A1 | 10/2015 | Koskiahde et al. |
| 2016/0359872 | A1 | 12/2016 | Yadav et al. |
| 2017/0346603 | A1 | 11/2017 | Koskinen |
| 2019/0044752 | A1 | 2/2019 | Sudrat et al. |
| 2019/0215385 | A1* | 7/2019 | Ethier ............... H04L 45/123 |
| 2019/0253342 | A1* | 8/2019 | Nádas ............... H04L 43/0847 |
| 2020/0076678 | A1* | 3/2020 | Hao ................. H04L 41/0654 |
| 2020/0228446 | A1* | 7/2020 | Geng ................. H04L 45/38 |
| 2021/0021510 | A1* | 1/2021 | Wetterwald ......... H04L 47/125 |
| 2021/0385169 | A1* | 12/2021 | Urman ................ H04L 1/08 |

FOREIGN PATENT DOCUMENTS

| | | |
|---|---|---|
| CN | 108156023 A | 6/2018 |
| CN | 108173755 A | 6/2018 |
| JP | 2004228754 A | 8/2004 |
| JP | 2009147579 A | 7/2009 |
| JP | 2009147597 A | 7/2009 |
| WO | 2015042117 A1 | 3/2015 |
| WO | 2016185794 A1 | 11/2016 |
| WO | 2021005397 A1 | 1/2021 |
| WO | 2021180910 A1 | 9/2021 |

OTHER PUBLICATIONS

Nasrallah, et al., "Ultra-Low Latency (ULL) Networks: The IEEE TSN and IETF DetNet Standards and Related 5G ULL Research," IEEE Communications Surveys & Tutorials, vol. 21, Issue 1, Mar. 2018, pp. 88-145.

Varga, et al., "802.1CB Improvements FRER Improvements of Replication and Elimination Functions," vol. 802, Issue 01, Jul. 15, 2019, Ericsson Research, 13 pages.

International Search Report and Written Opinion for International Patent Application No. PCT/EP2021/056306, mailed Jun. 22, 2021, 12 pages.

Anand, et al., "Formal Modeling and Analysis of the AFDX Frame Management Design," IEEE International Symposium on Object and Component-Oriented Real-Time Distributed Computing, Gyeongju, Korea, Apr. 24-26, 2006, pp. 393-399.

Author Unknown, "Information technology—Telecommunications and information exchange between systems—Local and metropolitan area networks—Specific requirements—Part 1CB: Frame replication and elimination for reliability," International Standard, First Edition, ISO/IEC/IEEE 8802-1CB, Feb. 2019, 104 pages.

Author Unknown, "IEEE Standard for Local and metropolitan area networks—Frame Replication and Elimination for Reliability," IEEE Std 802.1CB, 2017, IEEE Computer Society, 102 pages.

Time-Sensitive Networking Task Group, "Draft Standard for Local and metropolitan area networks—Frame Replication and Elimination for Reliability," IEEE P802.1CB/D2.8, Mar. 2017, 97 pages.

International Search Report and Written Opinion for International Patent Application No. PCT/IB2019/055763, mailed Mar. 3, 2020, 19 pages.

International Search Report and Written Opinion for International Patent Application No. PCT/EP2021/056309, mailed Jun. 29, 2021, 10 pages.

Notice of Reasons for Refusal for Japanese Patent Application No. 2022-554823, mailed Jan. 9, 2024, 7 pages.

Non-Final Office Action for U.S. Appl. No. 17/623,327, mailed Nov. 9, 2023, 11 pages.

Intention to Grant for European Patent Application No. 19769216.3, mailed May 7, 2024, 8 pages.

Notice of Reasons for Refusal for Japanese Patent Application No. 2022-554823, mailed Jun. 18, 2024, 4 pages.

Notice of Allowance for U.S. Appl. No. 17/623,327, mailed Jun. 6, 2024, 8 pages.

Author Unknown, "Draft Standard for Local and metropolitan area networks—Frame Replication and Elimination for Reliability," IEEE Standard P802.1CB/D2.4, Jun. 2016, Institute of Electrical and Electronics Engineers, Inc., 109 pages.

Restriction Requirement for U.S. Appl. No. 17/911,151, mailed Nov. 25, 2024, 7 pages.

Intention to Grant for European Patent Application No. 21712969.1, mailed Sep. 11, 2024, 7 pages.

First Office Action for Chinese Patent Application No. 202180020721.7, mailed Nov. 7, 2024, 8 pages.

\* cited by examiner

SYSTEMS AND METHODS FOR AVOIDING DUPLICATE DELIVERY IN THE RESET MECHANISM OF SEAMLESS REDUNDANCY (OF TSN/DETNET)

RELATED APPLICATIONS

This application is a 35 U.S.C. § 371 national phase filing of International Application No. PCT/EP2021/056309, filed Mar. 12, 2021, which claims the benefit of provisional patent application Ser. No. 62/989,305, filed Mar. 13, 2020, the disclosures of which are hereby incorporated herein by reference in their entireties.

TECHNICAL FIELD

The present disclosure relates to a redundancy mechanism in Time Sensitive Networking (TSN) network, Deterministic Networking (DetNet), or similar network technology and, more specifically, to avoidance of duplicate delivery due to an associated reset mechanism.

BACKGROUND

Time-Sensitive Networking (TSN) is currently being developed at the Institute for Electronics and Electrical Engineering (IEEE) as a new technology that enhances IEEE 802.1 and IEEE 802.3 Ethernet standards to an entirely new level of determinism. It can be seen as an evolution of Ethernet to guarantee low end-to-end latency, low jitter, and low packet loss.

The TSN Task Group (TG) within the IEEE 802.1 Working Group (WG) deals with deterministic services through IEEE 802 networks. The TSN TG specifies the tools of the TSN toolbox, as well as the use of the tools for a particular purpose. TSN TG is chartered to provide deterministic services through IEEE 802 networks with:
  guaranteed packet transport,
  low packet loss,
  bounded low latency, and
  low packet delay variation.

In order to achieve extremely low packet loss, the TSN TG specified Frame Replication and Elimination for Reliability (FRER) (802.1CB), which is targeted to avoid frame loss due to equipment failure. It is practically a per-frame 1+1 (or 1+n) redundancy function. There is no failure detection/switchover incorporated. FRER sends frames on two (or more) maximally disjoint paths, then combines the streams and deletes extra frames.

Note that the same functions are defined for Deterministic Networking (DetNet) networks as Packet Replication and Elimination Functions (PREFs) in order to simplify implementation and allow use of the same concept in both Layer2 (TSN) and Layer3 (DetNet) networks. In the description provided herein, the focus is on FRER.

Note as per IEEE 802.1CB: " . . . this standard defines Frame Replication and Elimination for Reliability (FRER), which divides a Stream into one or more linked Member Streams, thus making the original Stream a Compound Stream. It replicates the packets of the Stream, splitting the copies into the multiple Member Streams, and then rejoins those Member Streams at one or more other points, eliminates the replicates, and delivers the reconstituted Stream from those points."

An Elimination function evaluates the "sequence_number" sub-parameter of a packet of one or more Member Streams passed up from the lower layers, in order to discard duplicated packets. The "SequenceHistory" variable maintains a history of the "sequence_number" sub-parameters of recently received packets. During duplicate elimination, "sequence_number" is checked against a history window ("+/−frerSeqRcvyHistoryLength"). Packets being outside the history window are discarded as invalid. Under normal operation, received packets are within the history window and only duplicates are dropped.

IEEE 802.1CB defines a timeout mechanism for the Elimination function in order to cope with some networking scenarios that results in unnecessarily dropped frames (e.g., if Elimination function somehow gets out of step with its corresponding Sequence generation function; if a Sequence generation function is reset; etc.). If a timeout occurs, the history is reset, and it is allowed to accept the next packet by the recovery algorithm, no matter what the value of its "sequence_number" sub-parameter (see "TakeAny" in 7.4.3.2.6 in IEEE 802.1CB).

There currently exist certain challenge(s) with respect to FRER as defined in IEEE 802.1CB. The reset method for the Sequence recovery function defined in IEEE 802.1CB-2017 may cause temporary duplicate delivery in some cases. Duplicate delivery (even temporarily) is not acceptable for TSN networks as it breaks one of the basic design rules, namely a TSN Stream is not allowed to consume more than the resources reserved for it. Consuming more that the designated resources via duplicate delivery may cause violation of Quality of Service (QoS) requirements for some of the Streams, e.g., delay or loss violation.

SUMMARY

Systems and methods for avoiding duplicate delivery in the reset mechanism of seamless redundancy, e.g., of a Time Sensitive Networking (TSN) network or Deterministic Networking (DetNet) network, are disclosed herein. In one embodiment, a method performed by a receiving node that implements a redundancy mechanism based on sequence numbering or equivalent functionality comprises receiving packets from a plurality of packet streams from a transmitting node via a network. Each packet stream of the plurality of packet streams is a replication of a particular packet stream, the plurality of packet streams traverse separate paths from the transmitting node to the receiving node through the network, and each packet of each of the plurality of packet streams comprises a sequence indication that indicates a position of the packet within the particular packet stream. The method further comprises performing an elimination procedure that processes each received packet to determine whether to discard the received packet or to accept the received packet, wherein performing the elimination procedure comprises resetting one or more parameters utilized by the elimination procedure responsive to an occurrence of an event while receiving the packets and discarding all of the received packets processed by the elimination procedure from a time at which the elimination procedure was reset until an end of a defined period of time responsive to resetting the one or more parameters utilized by the elimination procedure. In this manner, no duplicate delivery happens due to the reset of the sequence generation function used for sequence number based seamless redundancy.

In one embodiment, the defined period of time has a duration that is equal to or greater than a maximum path delay difference between any two paths traversed by the plurality of packet streams through the network. In another embodiment, the defined period of time has a duration that is equal to a maximum path delay difference between any two paths traversed by the plurality of packet streams through the network.

In one embodiment, discarding received packets processed by the elimination procedure from the time at which the elimination procedure was reset until the end of the defined period of time comprises starting a timer that is set to a value that is equal to or greater than a maximum path delay difference between any two paths traversed by the plurality of packet streams through the network and discarding received packets that are processed by the elimination procedure as long as the time is running.

In one embodiment, performing the elimination procedure further comprises accepting a first received packet after the end of the defined period.

In one embodiment, the network is a TSN network, and the elimination procedure is performed as part of a Frame Replication and Elimination for Reliability (FRER) function of the receiving node. In one embodiment, the one or more parameters that are reset comprise a recovery sequence number parameter and a sequence history parameter.

In one embodiment, the network is a DetNet network, and the elimination procedure is performed as part of a Packet Replication and Elimination Function (PREF) function of the receiving node.

In one embodiment, the sequence indication is a sequence number. In another embodiment, the sequence indication is a timestamp.

Corresponding embodiments of a receiving node are also disclosed. In one embodiment, a receiving node that implements a redundancy mechanism based on sequence numbering or equivalent functionality is adapted to receive packets from a plurality of packet streams from a transmitting node via a network. Each packet stream of the plurality of packet streams is a replication of a particular packet stream, the plurality of packet streams traverse separate paths from the transmitting node to the receiving node through the network, and each packet of each of the plurality of packet streams comprises a sequence indication that indicates a position of the packet within the particular packet stream. The receiving node is further adapted to perform an elimination procedure that processes each received packet to determine whether to discard the received packet or to accept the received packet. In order to perform the elimination procedure, the receiving node is further adapted to, while receiving the packets, reset one or more parameters utilized by the elimination procedure responsive to an occurrence of an event and, responsive to resetting the one or more parameters utilized by the elimination procedure, discard all of the received packets processed by the elimination procedure from a time at which the elimination procedure was reset until an end of a defined period of time.

In one embodiment, a receiving node that implements a redundancy mechanism based on sequence numbering or equivalent functionality comprises a network interface and processing circuitry associated with the network interface. The processing circuitry is configured to cause the receiving node to receive packets from a plurality of packet streams from a transmitting node via a network. Each packet stream of the plurality of packet streams is a replication of a particular packet stream, the plurality of packet streams traverse separate paths from the transmitting node to the receiving node through the network, and each packet of each of the plurality of packet streams comprises a sequence indication that indicates a position of the packet within the particular packet stream. The processing circuitry is further configured to cause the receiving node to perform an elimination procedure that processes each received packet to determine whether to discard the received packet or to accept the received packet. In order to perform the elimination procedure, the processing circuitry is further configured to cause the receiving node to, while receiving the packets, reset one or more parameters utilized by the elimination procedure responsive to an occurrence of an event and, responsive to resetting the one or more parameters utilized by the elimination procedure, discard all of the received packets processed by the elimination procedure from a time at which the elimination procedure was reset until an end of a defined period of time.

In one embodiment, a method performed by a receiving node that implements a redundancy mechanism based on sequence numbering or equivalent functionality comprises receiving packets from a plurality of packet streams from a transmitting node via a network. Each packet stream of the plurality of packet streams is a replication of a particular packet stream, the plurality of packet streams traverse separate paths from the transmitting node to the receiving node through the network, and each packet of each of the plurality of packet streams comprises a sequence indication that indicates a position of the packet within the particular packet stream. The method further comprises performing an elimination procedure that processes each received packet to determine whether to discard the received packet or to accept the received packet, wherein performing the elimination procedure comprises detecting an occurrence of a reset event while receiving the packets and, responsive to detecting the reset event, performing one or more actions to discard or accept received packet(s), wherein the one or more actions are a function of a root-cause of the resetting.

In one embodiment, performing the one or more actions comprises determining the root-cause of the reset event, determining whether the root-cause of the reset event is a begin event or initialization event, and, responsive to determining that the root-cause of the reset event is a begin event or initialization event, collecting and storing a first "n" of the received packets since the reset event, selecting a packet from among the first "n" of the received packets with a latest sequence indication, and accepting the selected packet and discarding a remainder of the first "n" of the received packets.

In one embodiment, performing the one or more actions comprises determining whether the root-cause of the reset event is a management event and, responsive to determining that the root-cause of the reset event is a management event, determining whether a first received packet since the reset event can be accepted and accepting the first received packet responsive to determining that the first received packet since the reset event can be accepted. In one embodiment, determining whether the first received packet since the reset event can be accepted comprises preserving a plurality of sequence recovery related variables as they were before the reset event where the plurality of sequence recovery related variables comprises a history window and one or more parameters that indicate whether a packet with a particular sequence indication has already been received, determining whether the sequence indication of the first received packet is out of the predefined history window, determining that the first received packet can be accepted if the first received packet is out of the history window. Determining whether the first received packet since the reset event can be accepted further comprises, if the first received packet is within of the history window, determining whether the first received packet has already been received based on the one or more parameters that indicate whether a packet with a particular sequence indication has already been received, determining that the first received packet is to be discarded if the first received packet has already been received, and otherwise determining that the first received packet is to be accepted.

In one embodiment, performing the one or more actions comprises determining whether the root-cause of the reset event is a recovery timeout event and accepting a first received packet since the reset event responsive to determining that the root-cause of the reset event is a recovery timeout event.

In one embodiment, the network is a TSN network, and the elimination procedure is performed as part of a FRER function of the receiving node. In one embodiment, the one or more parameters associated to the elimination procedure comprise a recovery sequence number parameter and a sequence history parameter.

In one embodiment, the network is a DetNet network, and the elimination procedure is performed as part of a PREF function of the receiving node.

In one embodiment, the sequence indication is a sequence number. In another embodiment, the sequence indication is a timestamp.

Corresponding embodiments of a receiving node are also disclosed. In one embodiment, a receiving node that implements a redundancy mechanism based on sequence numbering or equivalent functionality is adapted to receive packets from a plurality of packet streams from a transmitting node via a network. Each packet stream of the plurality of packet streams is a replication of a particular packet stream, the plurality of packet streams traverse separate paths from the transmitting node to the receiving node through the network, and each packet of each of the plurality of packet streams comprises a sequence indication that indicates a position of the packet within the particular packet stream. The receiving node is further adapted to perform an elimination procedure that processes each received packet to determine whether to discard the received packet or to accept the received packet. In order to perform the elimination procedure, the receiving node is further adapted to detect an occurrence of a reset event while receiving the packets and, responsive to detecting the reset event, perform one or more actions to discard or accept received packet, wherein the one or more actions are a function of a root-cause of the resetting.

In one embodiment, a receiving node that implements a redundancy mechanism based on sequence numbering or equivalent functionality comprises a network interface and processing circuitry associated with the network interface. The processing circuitry is configured to cause the receiving node to receive packets from a plurality of packet streams from a transmitting node via a network. Each packet stream of the plurality of packet streams is a replication of a particular packet stream, the plurality of packet streams traverse separate paths from the transmitting node to the receiving node through the network, and each packet of each of the plurality of packet streams comprises a sequence indication that indicates a position of the packet within the particular packet stream. The processing circuitry is further configured to cause the receiving node to perform an elimination procedure that processes each received packet to determine whether to discard the received packet or to accept the received packet. The processing circuitry is further configured to cause the receiving node to, in order to perform the elimination procedure, detect an occurrence of a reset event while receiving the packets and, responsive to detecting the reset event, perform one or more actions to discard or accept received packet, wherein the one or more actions are a function of a root-cause of the resetting.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
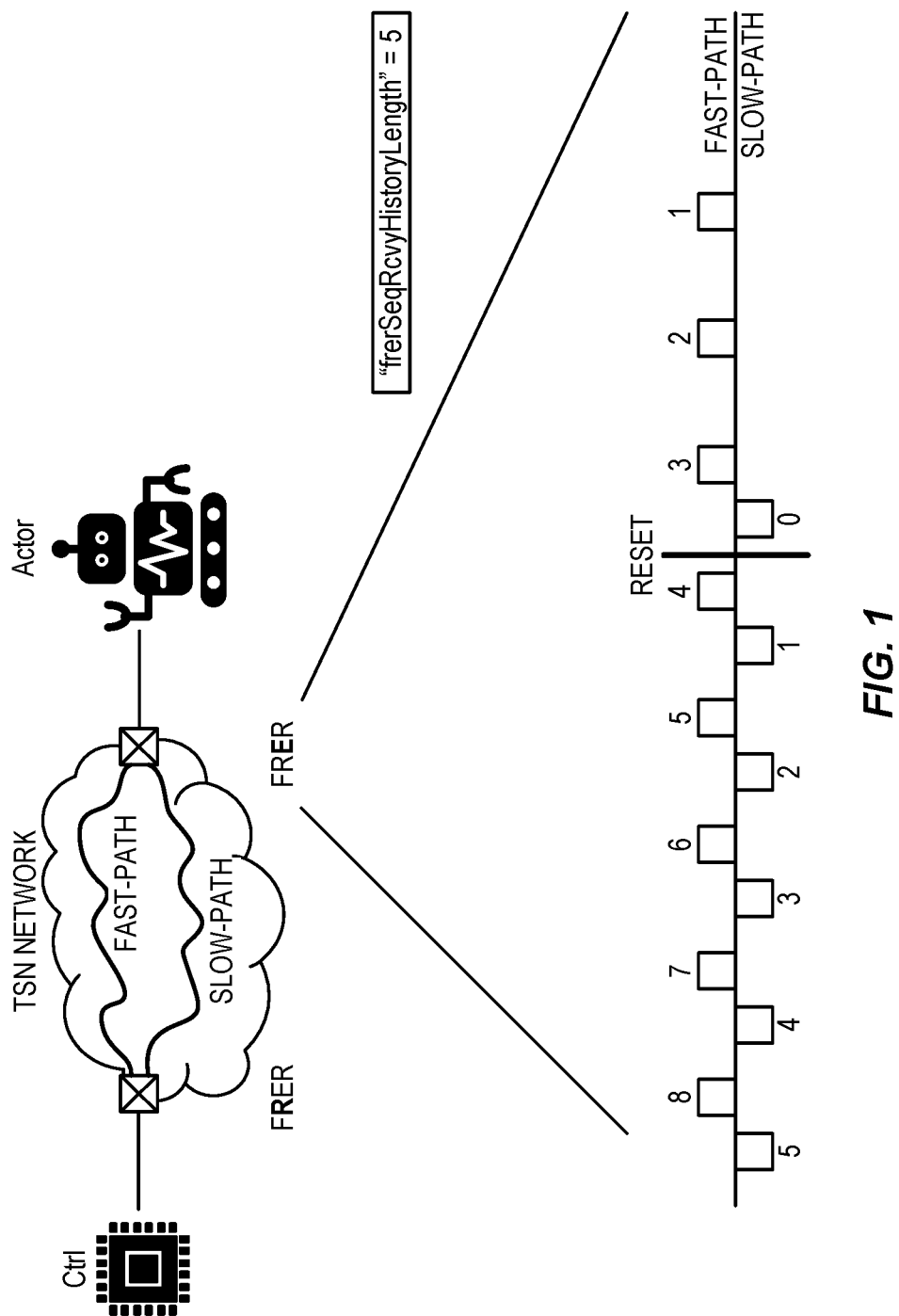
FIG. 1 shows such a duplicate delivery after reset of a Sequence Recovery function at a receiving node in a Time Sensitive Networking (TSN) network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

There currently exist certain challenge(s) with respect to Frame Replication and Elimination for Reliability (FRER) as defined in Institute for Electronics and Electrical Engineering (IEEE) 802.1CB. The reset method for the Sequence recovery function defined in IEEE 802.1CB-2017 may cause temporary duplicate delivery in some cases. Duplicate delivery (even temporarily) is not acceptable for Time Sensitive Networking (TSN) networks as it breaks one of the basic design rules, namely a TSN Stream is not allowed to consume more than the resources reserved for it. Consuming more that the designated resources via duplicate delivery may cause violation of Quality of Service (QoS) requirements for some of the Streams, e.g., delay or loss violation.

IEEE 802.1CB-2017 defines three reasons to reset the Sequence recovery function:
1. BEGIN event (initialization/reset),
2. Management event (also referred to herein as a MNGMT event) (frerSeqRcvyReset=true), and
3. RECOVERY_TIMEOUT event (timeout mechanism expired).

Reset the Sequence recovery function (see section 7.4.3.3 SequenceRecoveryReset of 802.1CB-2017) sets the "RecovSeqNum" to "RecovSeqSpace−1", clears the "SequenceHistory" array, and sets "TakeAny" to true.

Out of the paths used for seamless redundancy, the end-to-end delay of some paths is larger than that of other paths. A path with smaller end-to-end delay is called a fast path, whereas a path with larger end-to-end delay is called a slow path. Thus, the end-to-end delay is different for different copies/duplicates of a packet transferred over the different paths. This artifact of seamless redundancy has effects on its operation.

In case-1 (BEGIN) and case-2 (Management), the slow path may be transferring packets whose corresponding duplicates were already received and processed (forwarded) by the Elimination function of a node before the reset was generated. Such scenarios result in duplicate delivery. FIG. 1 shows such a duplicate delivery after reset of the Sequence Recovery function. After the reset, a packet with sequence_number=4 arrives over the fast path. It is accepted by the Elimination function due to the true value of "TakeAny". Packets received over the slow path after the reset (i.e., packet-1, packet-2, and packet-3) are also accepted as they are in the history window and the reset has cleared the "SequenceHistory". But these packets were already delivered before the reset so duplicate delivery happens.

Certain aspects of the present disclosure and their embodiments may provide solutions to the aforementioned or other challenges. Systems and methods are disclosed herein for avoiding duplicate delivery in the reset mechanism of the seamless redundancy of TSN or Deterministic Networking (DetNet). In particular, in some embodiments, the systems and methods ensure that no duplicate delivery is caused by the reset function. In one embodiment, a reset-guard period (also referred to herein as a guard-timer) is added after the reset, where received packets are dropped. In another embodiment, the reset procedure is modified to be root-cause dependent.

Embodiments disclosed herein provide improvements to the Elimination function of IEEE 802.1CB in order to achieve seamless reset of the Sequence recovery function. In one embodiment, a guard-timer based reset method is provided. In another embodiment, a reset method that takes into account the root cause of the reset is provided.

Embodiments of the solutions described herein are applicable to FRER of TSN, Packet Replication and Elimination Function (PREF) of DetNet, or other seamless redundancy mechanisms based on sequence numbering or equivalent functionality (e.g., provided by timestamps). In general, system and methods are described herein that avoid duplicate packets in the event of a reset of a sequencing function of a redundancy mechanism such as FRER of TSN or PREF of DetNet.

Certain embodiments may provide one or more of the following technical advantage(s). The embodiments described herein can ensure that no duplicate delivery happens due to the reset of the sequence generation function of sequence number based seamless redundancy.

The following description focuses on embodiments of the solutions described herein for improvement of the Sequence recovery function's reset in IEEE 802.1CB. As such, IEEE 802.1CB terminology and variable names are used herein where appropriate, denoted as "VariableName". New variables, functions, and parameters follow IEEE 802.1CB naming convention and are denoted as "NewEntityName". Although, the following description uses the terms, definitions, and functions specified by IEEE 802.1CB, the solutions described herein are applicable to FRER of TSN, PREF of DetNet, or other seamless redundancy mechanisms based on sequence numbering or equivalent functionality (e.g., provided by timestamps).

Figure 2:
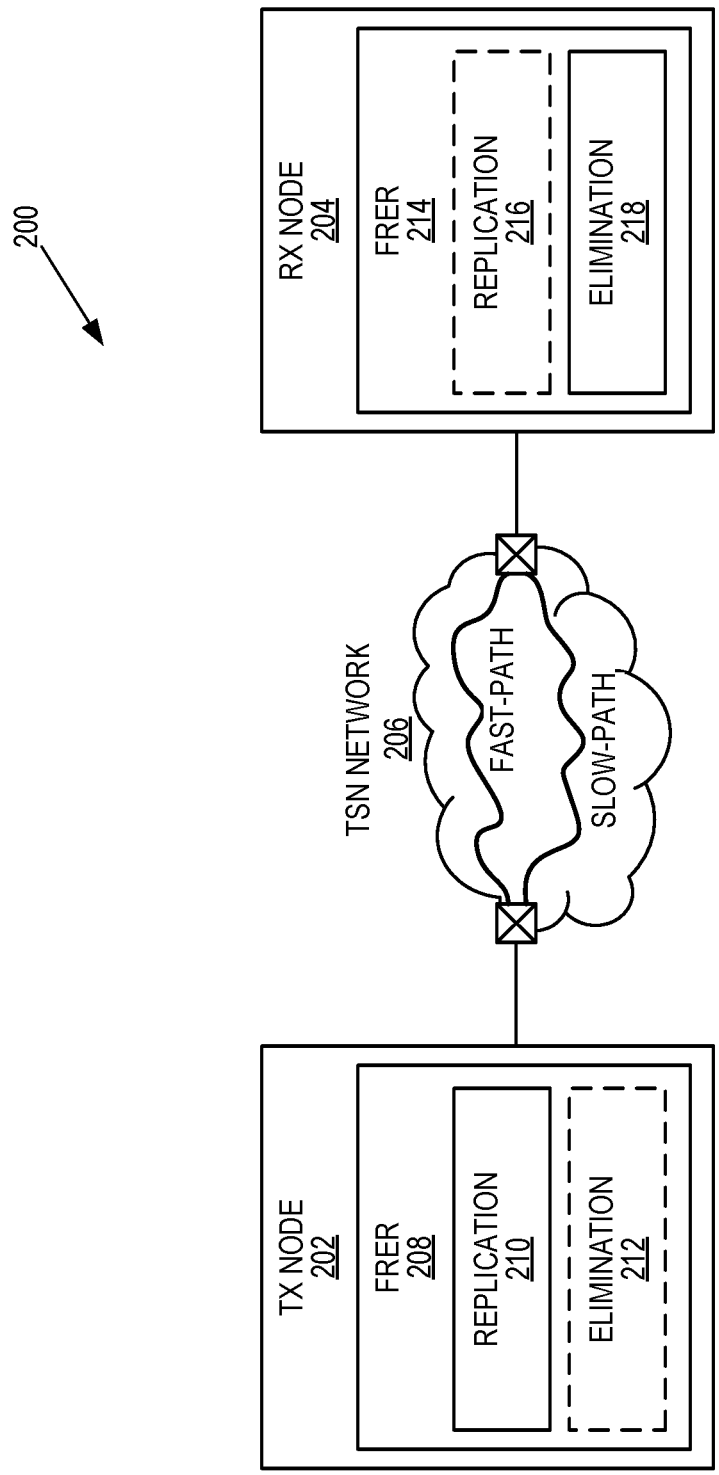
FIG. 2 illustrates a system that includes a transmitting (TX) node and a receiving (RX) node and in which embodiments of the present disclosure may be implemented.

FIG. 2 illustrates a system 200 that includes a transmitting (TX) node 202 and a receiving (RX) node 204, where the TX node 202 transmits a replicated stream of packets to the RX node 204 via a TSN network 206. As discussed above, transmission of the replicated stream of packets involves replicating a Stream of packets into multiple Member Streams to thereby provide a Compound Stream. The Member Streams are then transmitted to the RX node 204 via the TSN network 206 via maximally disjoint paths, including fast-path(s) and slow-path(s). Note that while the nodes 202 and 204 are denoted herein as "TX node" and "RX node", respectively, it should be understood that these nodes may both transmit and receive streams via the TSN network 206.

As illustrated, the TX node 202 includes a FRER function 208 that operates to provide FRER in accordance with, in this example, IEEE 802.1CB. The FRER 208 includes a Replication function 210 and an Elimination function 212 (illustrated as optional in the sense that it is not used for transmission of the Stream to the RX node 204). In a similar manner, the RX node 204 includes a FRER function 214 that operates to provide FRER in accordance with, in this example, IEEE 802.1CB. The FRER 214 includes a Replication function 216 (illustrated as optional in the sense that it is not used for reception of the Stream from the TX node 202) and an Elimination function 222.

When receiving the Member Streams of the Compound Stream transmitted by the TX node 204, the Elimination function 218 at the RX node 204 evaluates the "sequence_number" sub-parameter of each packet of each received Member Streams in order to discard duplicated packets. The "SequenceHistory" variable maintained by the FRER 214 at the RX node 204 maintains a history of the "sequence_number" sub-parameters of recently received packets. During duplicate elimination, the "sequence_number" of a received packet is checked against a history window ("+/−frerSeqRcvyHistoryLength"). If the packet is outside the history window, the packet is discarded as invalid. Under normal operation, received packets are within the history window and only duplicates are dropped. As described above, under certain circumstances, the Sequence Recovery function (part of the Elimination function 218) at the RX node 204 may be reset. Reset of the Sequence Recovery function sets "RecovSeqNum" to "RecovSeqSpace−1", clears the "SequenceHistory" array and sets "TakeAny" to true. If the conventional reset mechanism is used, this can result in duplicate packets being received (i.e., not being discarded by the Elimination function 218), as discussed above. As such, systems and methods relating to a new reset mechanism are described herein.

The root cause of the duplicate delivery is that slow path packets are within the history window by design. It is required for the proper operation of the Elimination function 218 at the RX node 204. Therefore, the purpose of the history is to avoid duplicates. However, if the reset clears the history, then the duplicate elimination capability provided by the history is lost.

Two solutions are proposed herein, each of which are described in detail below.

The first solution is to extend the reset mechanism with an added reset-guard period, where received packets are dropped. The duration of the reset-guard period depends on the delay difference of the different paths used by the Member Streams. For example, the maximum path delay difference between any pair of the Member Streams can be computed as follows:

$$\text{MaxPathDelayDiff} = \text{maximum}_{\text{for all "i" and "j"}} (\text{PathDelay}_i - \text{PathDelay}_j)$$

where "n" denotes the number of Member Streams and i, j={1 ... n}. In one embodiment, the reset-guard period is set to MaxPathDelayaff. However, in an alternative embodiment, the reset-guard period is set to a value that is greater than or equal to MaxPathDelayDiff.

In one embodiment, the reset-guard period timer ("ResetGuardTimer") is used by the Elimination function 218 of the FRER 214 at the RX node 204 as follows:

When the Sequence Recovery function is reset, the Elimination function 218 sets "TakeAny" true, sets the "ResetGuardTimer" to the "MaxPathDelayDiff" of the Stream, and clears the sequence number history ("SequenceHistory"). In IEEE 802.1CB "TakeAny" is a Boolean value indicating whether the Elimination function 218 is to accept the next packet, no matter what the value of its sequence_number subparameter. "SequenceHistory" is a history of packet sequence numbers that have been received for the Stream.

The Elimination function 218 drops all received packets of the Member Streams until "ResetGuardTimer" expires.

Once the "ResetGuardTimer" has expired, the Elimination function 218 accepts the first packet received from any of the Member Streams and updates "RecovSeqNum" and "SequenceHistory" accordingly. In IEEE 802.CB, the "RecovSeqNum" holds the highest sequence number value received (modulo(RecovSeqSpace), or the value (RecovSeqSpace−1), if none have been received since the sequence recovery function was reset. The "RecovSeqNum" variable is an unsigned integer in the range 0 to (RecovSeqSpace−1). RecovSeqSpace is defined in Section 7.4.3.2.1 of IEEE 802.1CB. RecovSeqNum is initialized to (RecovSeqSpace−1) whenever the function is reset. When incremented past its maximum value, the new value is 0.

Back to normal operation of Elimination

Figure 3:
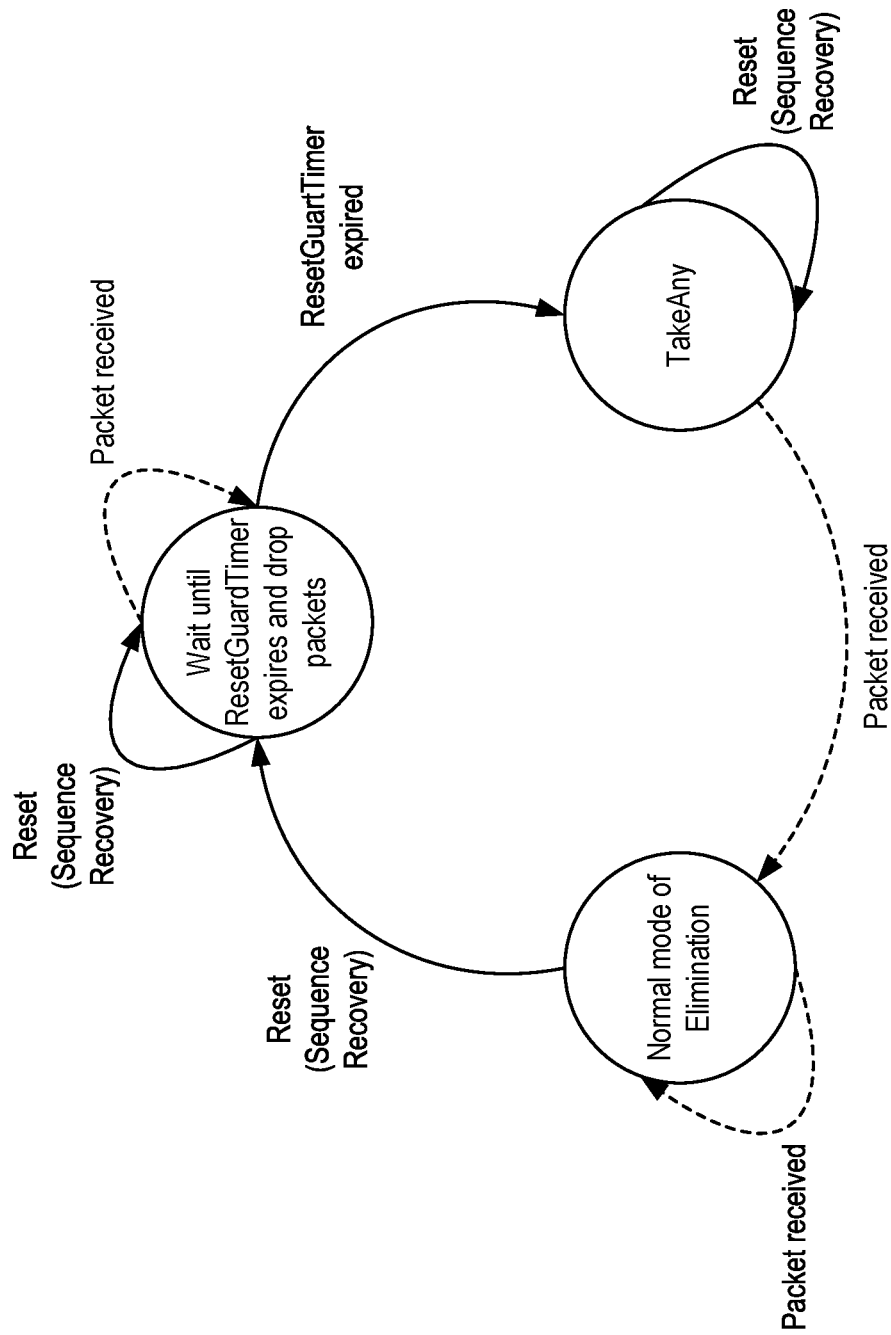
FIG. 3 is a state diagram that illustrates the operation of the Elimination function at the RX node of FIG. 2 in accordance with one embodiment of a first solution described herein.

FIG. 3 is a state diagram that illustrates the operation of the Elimination function 218 at the RX node 204 in accordance with the first solution. As illustrated, starting from the normal mode of Elimination, packets are received and the normal elimination procedure is performed. Upon reset, the Elimination function 218 transitions into a state in which the Elimination function 218 waits until the ResetGuardTimer expires. Until this timer expires, the Elimination function 218 drops all received packets. Upon expiry of the ResetGuardTimer, the Elimination function 218 transitions into a state in which the Elimination function 218 takes, or accepts, any received packet. Upon receive of a packet, the Elimination function 218 returns to the state in which the Elimination function 218 performs the normal mode of elimination.

Figure 4:
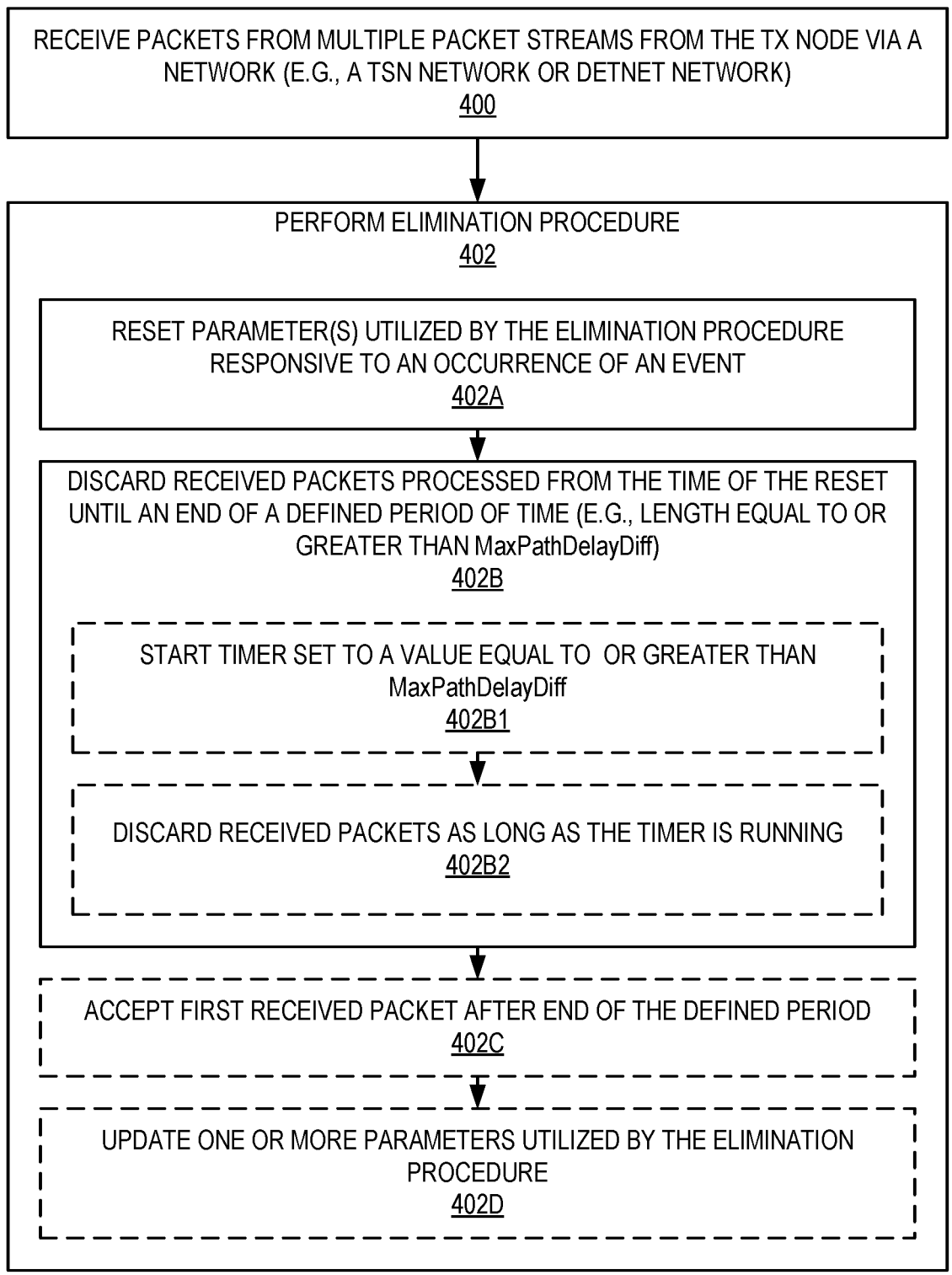
FIG. 4 is a flow chart that illustrates the operation of the RX node in accordance with at least some aspects of the first solution described herein.

FIG. 4 is a flow chart that illustrates the operation of the RX node 204 in accordance with at least some aspects of the first solution described above. Here, the operation of the RX node 204 is not limited to FRER for TSN. Rather, the process of FIG. 4 generally applies to FRER of TSN, PREF of DetNet, or other seamless redundancy mechanisms based on sequence numbering or equivalent functionality (e.g., provided by timestamps). Note that optional steps are represented by dashed lines/boxes.

As illustrated in FIG. 4, the RX node 204 receives packets from multiple packet streams from the TX node 202 via a network (e.g., an Ethernet network using TSN network (referred to herein as a TSN network) or a DetNet network (which can use any L2 networking technology including, but not limited to, Ethernet) (step 400). Each packet stream is a replication of a particular packet stream (e.g., in IEEE 802.1CB terminology, each packet stream is a Member Stream). The packet streams traverse separate paths (e.g., maximally disjoint paths) from the TX node 202 to the RX node 204 through the network. Further, each packet of each of the plurality of packet streams comprises a sequence indication that indicates a position of the packet within the particular packet stream. The sequence indication may be, for example, a sequence number (e.g., as in IEEE 802.1CB), a timestamp, or some equivalent mechanism for defining the position of the packet within the particular packet stream being replicated).

The RX node 202 performs an elimination procedure that processes each received packet to determine whether to discard the received packet or to accept the received packet (step 402). Performing the elimination procedure includes, while receiving the packets, resetting one or more parameters utilized by the elimination procedure responsive to an occurrence of an event (step 402A). As an example, for FRER for TSN, the event may be a BEGIN event, a MNGMT event, or a RECOVERY_TIMEOUT event. Responsive to resetting the elimination procedure, the RX node 202 discards all received packets processed by the elimination procedure from a time at which the elimination procedure was reset until an end of a defined period of time (step 4026). In other words, the RX node 202 discards all received packets that are received and processed by the elimination procedure during the reset-guard period. As discussed above, in some embodiments, the defined period of time has a duration that is equal to or greater than a maximum path delay difference between any two paths traversed by the plurality of packet streams through the network. In some other embodiments, the defined period of time has a duration that is equal to a maximum path delay difference between any two paths traversed by the plurality of packet streams through the network.

In some embodiments, discarding received packets processed by the elimination procedure from the time at which the elimination procedure was reset until the end of the defined period of time comprises starting a timer that is set to a value that is equal to or greater than a maximum path delay difference between any two paths traversed by the plurality of packet streams through the network (step 40261) and discarding received packets that are processed by the elimination procedure as long as the time is running (step 40262). One embodiment of this timer is the reset-guard period timer discussed above.

In one embodiment, performing the elimination procedure further comprises accepting a first received packet after the end of the defined period (step 402C) and updating one or more parameters utilized by the elimination procedure accordingly (step 402D), as described above.

In one embodiment, the network is a TSN network, and the elimination procedure is performed as part of a FRER function of the RX node 204. Further, in one embodiment, the one or more parameters that are reset in step 402A comprise a recovery sequence number parameter and a sequence history parameter, as described above. In another embodiment, the network is a DetNet network, and the elimination procedure is performed as part of a PREF function of the RX node 204.

In a second solution disclosed herein, the reset procedure is modified according to a root-cause of the reset. In the description below, "n" denotes the number of Member Streams. The root-cause of the reset may be a BEGIN event, a MNGMT event (management initiated reset of the sequence recovery function), or a RECOVERY_TIMEOUT event. The operation of the Elimination function 218 at the RX node 204 in accordance with the second solution is described below for each of these root-causes of the reset. Note, however, the Elimination function 218 is not required to implement the second solution for all of these root-causes of the rest. Rather, the Elimination function 218 may implement the second solution for any one or more of these root-causes of the reset.

In case of the root-cause of the reset being a BEGIN event, there is a node initialization or a reset. All variables are set to their default values, and their values before the reset event are forgotten. When a BEGIN event caused the reset, the Elimination function 214 of the RX node 204 operates as follows:

When the Sequence Recovery function of the Elimination function 218 is reset due to a BEGIN event, the Elimination function 218 collects and stores the first "n" of the received packets from any of the Member Streams.

The Elimination function 218 selects the packet with the largest "sequence_number" from among the collected and stored packets. If multiple packets exist with the largest "sequence_number", the Elimination function 218 picks one of them (e.g., any one of them). Note that the largest "sequence_number" is selected by taking into account the cyclic characteristics of the sequence number space. Note also that, in correctly designed systems, the difference of the sequence_numbers of the "n" packets is within the history window.

The Elimination function 214 forwards (e.g., to a higher layer(s) in the protocol stack of the RX node 204) only the selected packet and discards all the other stored packets.

The Elimination function 214 sets "RecovSeqNum" to the sequence_number of the selected packet and sets the history to all "1" ("SequenceHistory"=[1, . . . , 1]) (i.e., setting the history to indicate that all packets within the history window were already received). No packets with a sequence number lower than the RecovSeqNum are accepted.

The Elimination function 214 may then return normal operation.

In case of the root-cause of the reset being a MNGMT event, a sequence recovery function reset has been requested by the management system via the "frerSeqRcvyReset" variable. In this case, values of sequence recovery related variables are preserved as they were before the reset and are used during the evaluation of the received packets. When a MNGMT event caused the reset, the Elimination function 214 of the RX node 204 operates as follows:

When the Sequence Recovery function of the Elimination function 218 is reset due to a MNGMT event, the Elimination function 214 checks whether or not the first received packet from any of the Member Streams after reset can be accepted as follows:

If the sequence_number of the received packet is out of the history window (HSW: history window {RecovSeqNum+d; . . . ; RecovSeqNum−d+1}, where d="frerSeqRcvyHistoryLength"), then the packet is accepted. "RecovSeqNum" is set to the sequence_number of the received packet, and the history is updated to show the acceptance ("SequenceHistory"=[1, 0, . . . , 0]).

If the sequence_number of the received packet is within the history window (HSW: history window {RecovSeqNum+d; . . . ; RecovSeqNum−d+1}, where d="frerSeqRcvyHistoryLength"), then it is evaluated against the preserved values of "RecovSeqNum" and "SequenceHistory" to determine whether or not the packet has already been received. If the packet has already been received, then the packet is dropped. If the packet has not already been received, then packet is forwarded, and "RecovSeqNum" and "SequenceHistory" are updated accordingly.

Go back to normal operation of the Elimination function 214.

In case of the root-cause of the reset being a RECOVERY_TIMEOUT event, the timeout mechanism triggers the reset. If the timeout mechanism is properly designed, the timeout lasts longer than the delay difference of the different paths of the Member Streams; therefore, the history can be cleared, and the first packet can be accepted without any risk of duplicate delivery. When a RECOVERY_TIMEOUT event caused the reset, the Elimination function 214 of the RX node 204 operates as follows:

When the Sequence Recovery function of the Elimination function 218 is reset due to a RECOVERY_TIMEOUT event, the Elimination function 218 accepts the first packet received, forwards the packet (e.g., to a higher layer(s) in the protocol stack of the RX node 204, sets "RecovSeqNum" to the sequence_number of the received packet, and updates the history accordingly (e.g., updates the history to "SequenceHistory"= [1, 0, . . . , 0]).

Go back to the normal operation of the Elimination function

Figure 5:
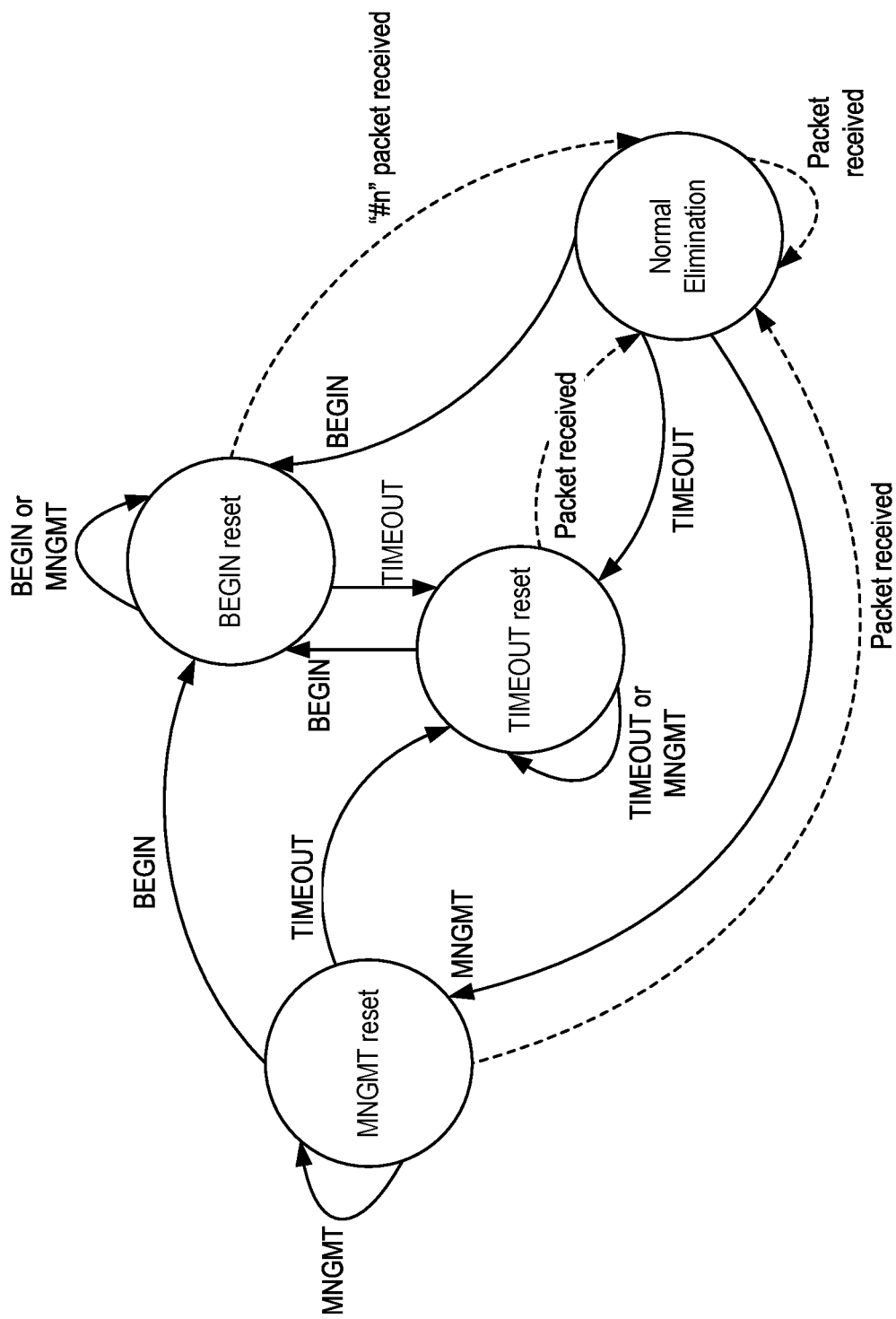
FIG. 5 is a state diagram that illustrates the operation of the Elimination function at the RX node of FIG. 2 in accordance with one embodiment of a second solution described herein.

FIG. 5 is a state diagram when the reset procedure takes into account the root-cause of the reset in accordance with the second solution described above.

Figure 6:
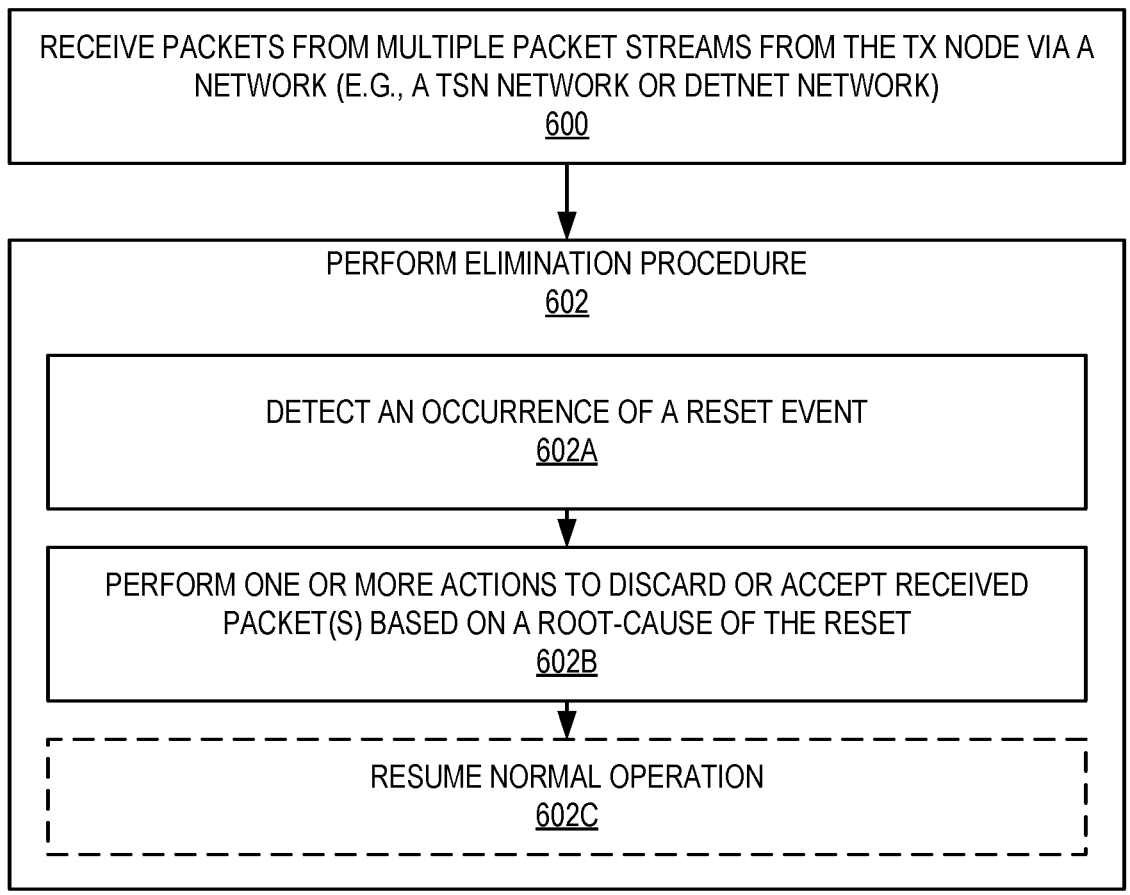
FIG. 6 is a flow chart that illustrates the operation of the RX node in accordance with at least some aspects of the second solution described herein.

FIG. 6 illustrates the operation of the RX node 204 in accordance with at least some aspects of the second solution described above. Here, the operation of the receiving node 204 is not limited to FRER for TSN. Rather, the process of FIG. 6 generally applies to FRER of TSN, PREF of DetNet, or other seamless redundancy mechanisms based on sequence numbering or equivalent functionality (e.g., provided by timestamps). Note that optional steps are represented by dashed lines/boxes.

As illustrated in FIG. 6, the receiving node 204 receives packets from multiple packet streams from the TX node 202 via a network (e.g., a TSN network or a DetNet network) (step 600). Each packet stream is a replication of a particular packet stream (e.g., in IEEE 802.1CB terminology, each packet stream is a Member Stream). The packet streams traverse separate paths (e.g., maximally disjoint paths) from the TX node 202 to the RX node 204 through the network. Further, each packet of each of the plurality of packet streams comprises a sequence indication that indicates a position of the packet within the particular packet stream. The sequence indication may be, for example, a sequence number (e.g., as in IEEE 802.1CB), a timestamp, or some equivalent mechanism for defining the position of the packet within the particular packet stream being replicated).

The RX node 202 performs an elimination procedure that processes each received packet to determine whether to discard the received packet or to accept the received packet (step 602). Performing the elimination procedure includes, while receiving the packets, detecting an occurrence of a reset event (step 602A). As an example, for FRER for TSN, the reset event may be a BEGIN event, a MNGMT event, or a RECOVERY_TIMEOUT event. Responsive to detecting the reset event, the RX node 202 performs one or more actions to discard or accept received packet(s), wherein the one or more actions are a function of a root-cause of the reset event (step 602B). The RX node 204 may then resume normal operation with respect to the elimination procedure (step 602C).

Figure 7A:
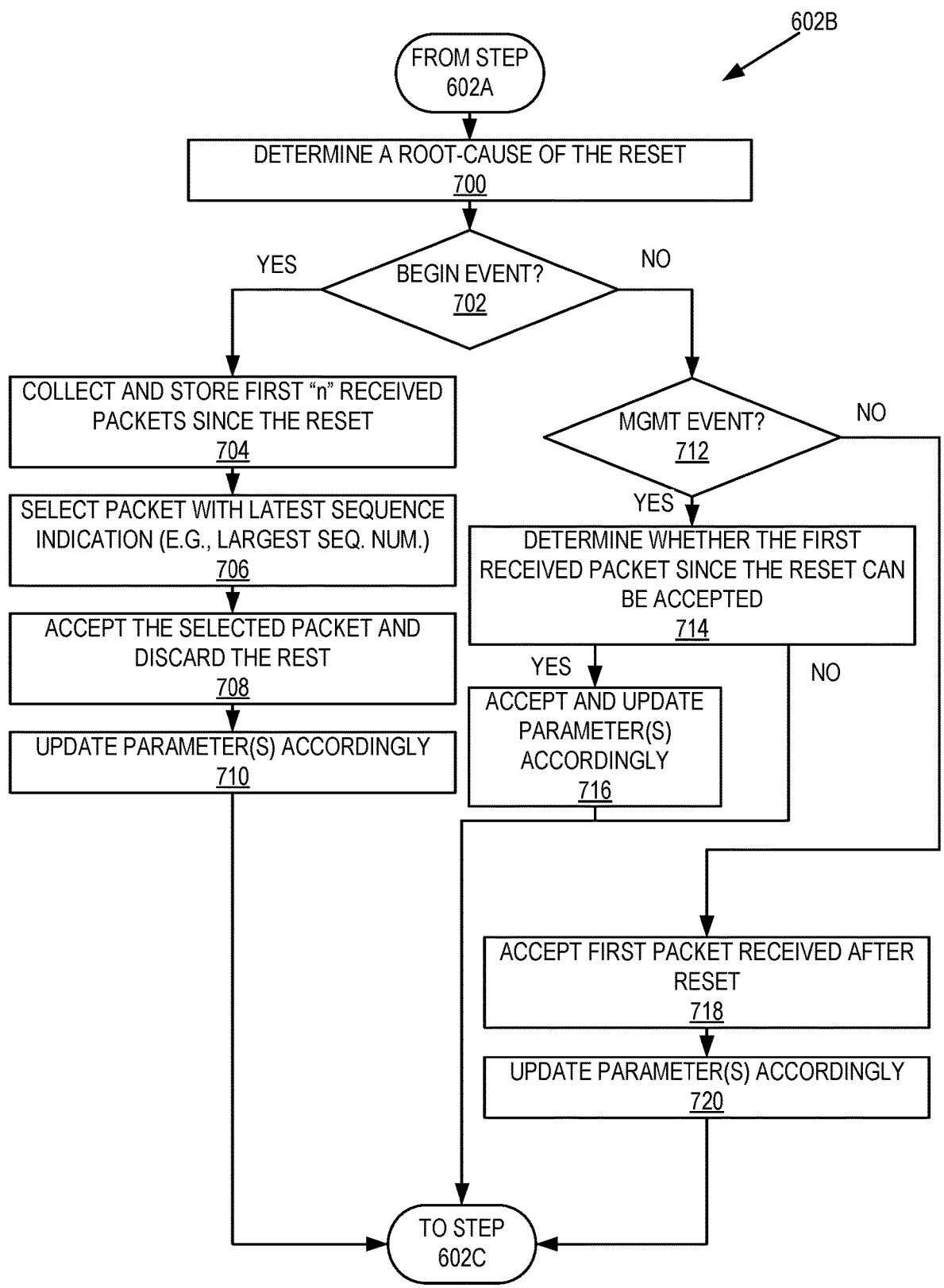
FIG. 7A is a flow chart that illustrates step 602B of FIG. 6 in more detail in accordance with one embodiment of the present disclosure.

FIG. 7A is a flow chart that illustrates step 602B in more detail in accordance with at least some aspects of the second solution. Again, the operation of the receiving node 204 is not limited to FRER for TSN. Rather, the process of FIG. 7A generally applies to FRER of TSN, PREF of DetNet, or other seamless redundancy mechanisms based on sequence numbering or equivalent functionality (e.g., provided by timestamps). Note that optional steps are represented by dashed lines/boxes.

As illustrated in FIG. 7A, in order to perform the one or more actions to discard or accept the received packet(s) since the reset based on the root-cause of the reset, the RX node 204 determines the root-cause of the resetting (step 700). Again, using FRER as an example, the root-cause may be a BEGIN event, a MNGMT event, or a RECOVERY_TIMEOUT event. While these terms are used in FIG. 7A, in this context, they are to be understood to generally cover corresponding events in PREF.

The RX node 204 determines whether the root-cause of the resetting is a BEGIN event or initialization event (step 700). If the root-cause is a BEGIN event or an initialization event (step 702, YES), variables are set to their default values, and their values before the reset event are forgotten, as described above. Further, the RX node 204 collects and stores a first "n" of the received packets since the resetting (step 704), selects a packet with a latest sequence indication (e.g., a largest sequence number) (step 706), and accepts the selected packet and discards a remainder of the first "n" of the received packets (step 708). The RX node 204 updates the parameter(s) of the elimination procedure according, as described above (step 710).

Figure 7B:
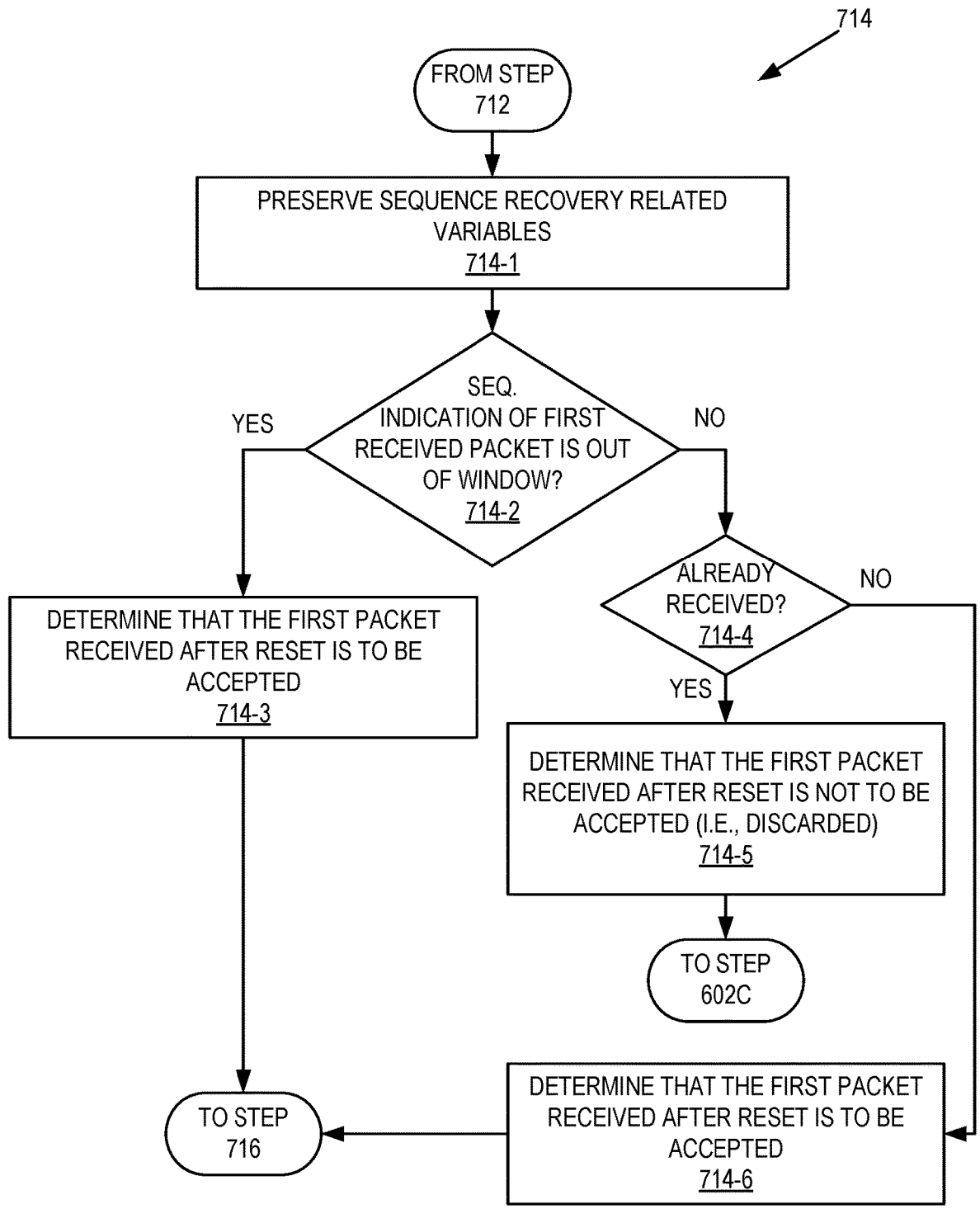
FIG. 7B is a flow chart that illustrates step 714 of FIG. 7A in more detail in accordance with one embodiment of the present disclosure.

If the root-cause is a MNGMT event (step 702, NO and step 712, YES), the RX node 204 determines whether a first received packet since the resetting can be accepted (step 714). If so, the RX node 204 accepts the first received packet and updates the parameter(s) of the elimination procedure accordingly, as described above (step 716). In regard to step 714, in one embodiment as illustrated in FIG. 7B, the RX node 204 determines whether the first received packet can be accepted by preserving a plurality of sequence recovery related variables as they were before the resetting where the plurality of sequence recovery related variables comprise a history window and one or more parameters that indicate whether a packet with a particular sequence indication has already been received (e.g., "RecovSeqNum" and "SequenceHistory") and determining whether the sequence indication of the first received packet is out of the predefined history window (steps 714-1 and 714-2). If the first received packet is out of the history window (step 714-2, YES), the RX node 204 determines that the first received packet can be accepted (714-3). If the first received packet is within of the history window (step 714-2, NO), the RX node 204 determines whether the first received packet has already been received based on the one or more parameters that indicate whether a packet with a particular sequence indication has already been received (step 714-3). If the first received packet has already been received (step 714-3, YES), the RX node 204 determines that the first received packet (step 714-5) can be discarded; otherwise, the RX node 204 determines the first received packet can be accepted (step 714-6).

Returning to FIG. 7A, if the root-cause of the resetting is a recovery timeout event (step 702, NO and step 712, NO), the RX node 204 accept a first received packet since the resetting (step 718) and updates the parameter(s) of the elimination procedure accordingly, as described above (step 720).

Again, in one embodiment, the network is a TSN network, and the elimination procedure is performed as part of a FRER function of the RX node 204. In one embodiment, the one or more parameters that are reset comprise a recovery sequence number parameter and a sequence history parameter. In another embodiment, the network is a DetNet network, and the elimination procedure is performed as part of a PREF, function of the RX node 204.

As discussed above, in one embodiment, the sequence indication is a sequence number. In another embodiment, the sequence indication is a timestamp.

Figure 8:
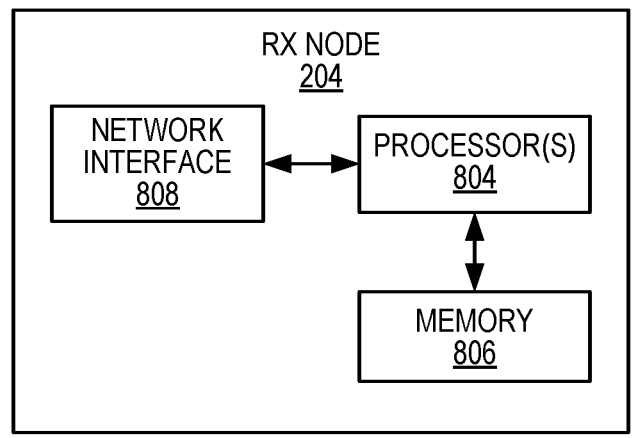
FIGS. 8, 9 and 10 are schematic block diagrams of the RX node according to some embodiments of the present disclosure.

FIG. 8 is a schematic block diagram of the RX node 204 according to some embodiments of the present disclosure. As illustrated, the RX node 204 includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. The one or more processors 804 operate to provide one or more functions of the RX node 204 as described herein. In some embodiments, the function(s) are implemented in software that is stored, e.g., in the memory 806 and executed by the one or more processors 804.

Figure 9:
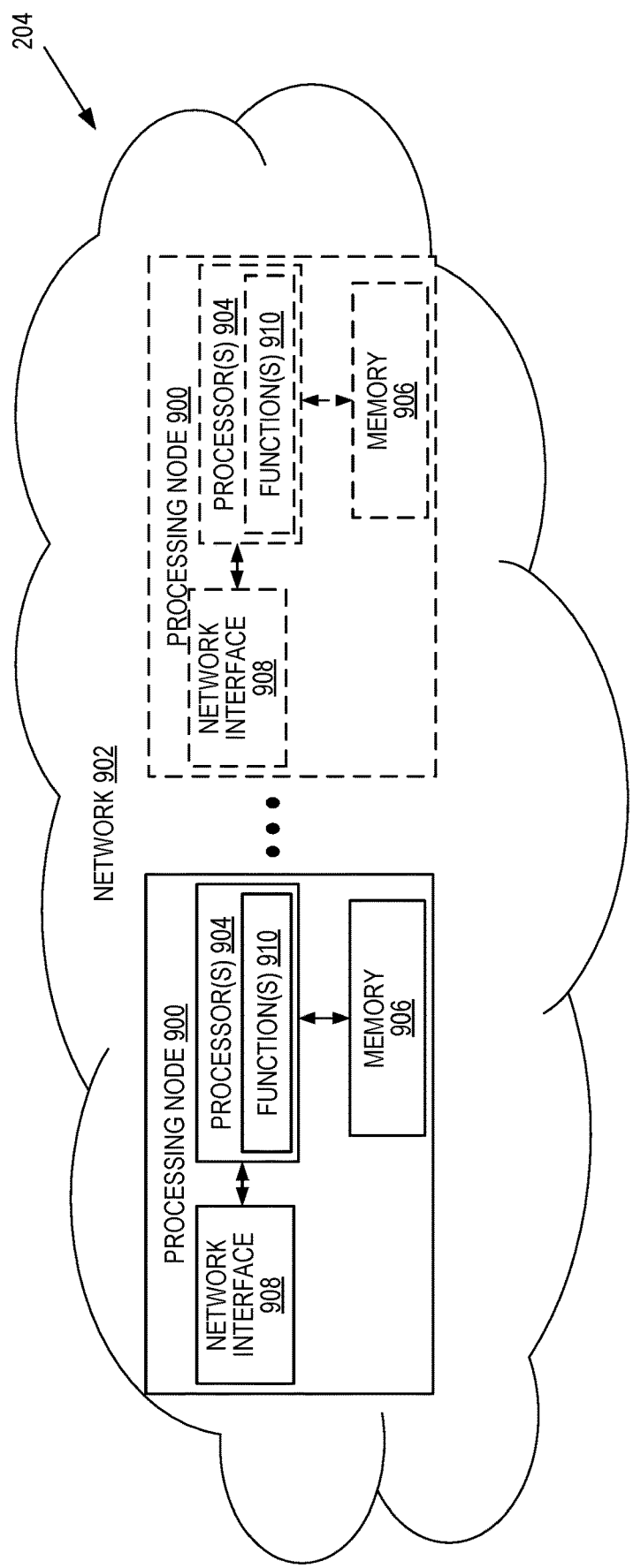

FIG. 9 is a schematic block diagram that illustrates a virtualized embodiment of the RX node 204 according to some embodiments of the present disclosure. This discussion is equally applicable to other types of network nodes.

Further, other types of network nodes may have similar virtualized architectures. Again, optional features are represented by dashed boxes.

As used herein, a "virtualized" RX node is an implementation of the RX node 204 in which at least a portion of the functionality of the RX node 204 is implemented as a virtual component(s) (e.g., via a virtual machine(s) executing on a physical processing node(s) in a network(s)). As illustrated, in this example, the RX node 204 includes one or more processing nodes 900 coupled to or included as part of a network(s) 902. Each processing node 900 includes one or more processors 904 (e.g., CPUs, ASICs, FPGAs, and/or the like), memory 906, and a network interface 908. In this example, functions 910 of the RX node 204 described herein are implemented at one of the processing nodes 900 or distributed across two or more of the processing nodes 900 in any desired manner. In some particular embodiments, some or all of the functions 910 of the RX node 204 described herein are implemented as virtual components executed by one or more virtual machines implemented in a virtual environment(s) hosted by the processing node(s) 900.

In some embodiments, a computer program including instructions which, when executed by at least one processor, causes the at least one processor to carry out the functionality of the RX node 204 or a node (e.g., a processing node 900) implementing one or more of the functions 910 of the RX node 204 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
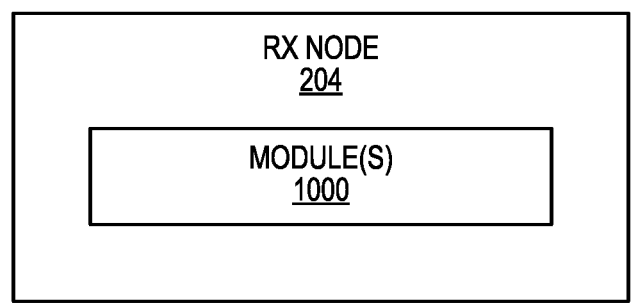

FIG. 10 is a schematic block diagram of the RX node 204 according to some other embodiments of the present disclosure. The RX node 204 includes one or more modules 1000, each of which is implemented in software. The module(s) 1000 provide the functionality of the RX node 204 described herein. This discussion is equally applicable to the processing node 900 of FIG. 9 where the modules 1000 may be implemented at one of the processing nodes 900 or distributed across multiple processing nodes 900.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a receiving node (204) that implements a redundancy mechanism based on sequence numbering or equivalent functionality, the method comprising:
 receiving (400) packets from a plurality of packet streams from a transmitting node (202) via a network, wherein:
  a each packet stream of the plurality of packet streams is a replication of a particular packet stream;
  the plurality of packet streams traverse separate paths from the transmitting node (202) to the receiving node (204) through the network; and
  each packet of each of the plurality of packet streams comprises a sequence indication that indicates a position of the packet within the particular packet stream;
 performing (402) an elimination procedure that processes each received packet to determine whether to discard the received packet or to accept the received packet, wherein performing (402) the elimination procedure comprises:
  while receiving (400) the packets, resetting (402A) one or more parameters utilized by the elimination procedure responsive to an occurrence of an event; and
  responsive to resetting (402B) the one or more parameters utilized by the elimination procedure, discarding (402C) all of the received packets processed by the elimination procedure from a time at which the elimination procedure was reset until an end of a defined period of time.

Embodiment 2: The method of embodiment 1 wherein the defined period of time has a duration that is equal to or greater than a maximum path delay difference between any two paths traversed by the plurality of packet streams through the network.

Embodiment 3: The method of embodiment 1 wherein the defined period of time has a duration that is equal to a maximum path delay difference between any two paths traversed by the plurality of packet streams through the network.

Embodiment 4: The method of any one of embodiment 1 wherein discarding (402B) received packets processed by the elimination procedure from the time at which the elimination procedure was reset until the end of the defined period of time comprises: starting (402B1) a timer that is set to a value that is equal to or greater than a maximum path delay difference between any two paths traversed by the plurality of packet streams through the network; and discarding (402B2) received packets that are processed by the elimination procedure as long as the time is running.

Embodiment 5: The method of any one of embodiments 1 to 4 wherein performing (402) the elimination procedure further comprises accepting (402C) a first received packet after the end of the defined period.

Embodiment 6: The method of any one of embodiments 1 to 5 wherein the network is a Time-Sensitive Networking, TSN, network, and the elimination procedure is performed as part of a Frame Replication and Elimination for Reliability, FRER, function of the receiving node (204).

Embodiment 7: The method of embodiment 6 wherein the one or more parameters that are reset comprise a recovery sequence number parameter and a sequence history parameter.

Embodiment 8: The method of any one of embodiments 1 to 5 wherein the network is a Deterministic Networking, DetNet, network, and the elimination procedure is performed as part of a Packet Replication and Elimination Function, PREF, function of the receiving node (204).

Embodiment 9: The method of any one of embodiments 1 to 8 wherein the sequence indication is a sequence number.

Embodiment 10: The method of any one of embodiments 1 to 8 wherein the sequence indication is a timestamp.

Embodiment 11: A method performed by a receiving node (204) that implements a redundancy mechanism based on sequence numbering or equivalent functionality, the method comprising:
- receiving (600) packets from a plurality of packet streams from a transmitting node (202) via a network, wherein:
  - each packet stream of the plurality of packet streams is a replication of a particular packet stream;
  - the plurality of packet streams traverse separate paths from the transmitting node (202) to the receiving node (204) through the network; and
  - each packet of each of the plurality of packet streams comprises a sequence indication that indicates a position of the packet within the particular packet stream;
- performing (602) an elimination procedure that processes each received packet to determine whether to discard the received packet or to accept the received packet, wherein performing (602) the elimination procedure comprises:
  - while receiving (600) the packets, detecting (602A) an occurrence of a reset event; and
  - responsive to detecting (602B) the reset event, performing (602C) one or more actions to discard or accept received packet(s), wherein the one or more actions are a function of a root-cause of the resetting (602B).

Embodiment 12: The method of embodiment 11 wherein performing (602C) the one or more actions comprises:
- determining (700) the root-cause of the reset event;
- determining (702) whether the root-cause of the reset event is a begin event or initialization event;
- responsive to determining (702, YES) that the root-cause of the reset event is a begin event or initialization event:
  - collecting and storing (704) a first "n" of the received packets since the reset event;
  - selecting (706) a packet from among the first "n" of the received packets with a latest sequence indication (e.g., a largest sequence number); and
  - accepting (708) the selected packet and discarding a remainder of the first "n" of the received packets.

Embodiment 13: The method of embodiment 11 or 12 wherein performing (602C) the one or more actions comprises:
- determining (712) whether the root-cause of the reset event is a management event;
- responsive to determining (712, YES) that the root-cause of the reset event is a management event:
  - determining (714) whether a first received packet since the reset event can be accepted; and
  - responsive to determining (714, YES) that the first received packet since the reset event can be accepted, accepting (716) the first received packet.

Embodiment 14: The method of embodiment 13 wherein determining (714) whether the first received packet since the reset event can be accepted comprises:
- preserving a plurality of sequence recovery related variables as they were before the reset event, the plurality of sequence recovery related variables comprising a history window and one or more parameters that indicate whether a packet with a particular sequence indication has already been received (e.g., "RecovSeqNum" and "SequenceHistory");
- determining whether the sequence indication of the first received packet is out of the predefined history window;
- if the first received packet is out of the history window, determining that the first received packet can be accepted; and
- if the first received packet is within of the history window:
  - determining whether the first received packet has already been received based on the one or more parameters that indicate whether a packet with a particular sequence indication has already been received;
  - if the first received packet has already been received, discarding the first received packet;
  - otherwise, accepting the first received packet.

Embodiment 15: The method of any one of embodiments 11 to 14 wherein performing (602C) the one or more actions comprises: determining (702, NO and 712, NO) whether the root-cause of the reset event is a recovery timeout event; and, responsive to determining (702, NO and 712, NO) that the root-cause of the reset event is a recovery timeout event, accepting (718) a first received packet since the reset event.

Embodiment 16: The method of any one of embodiments 11 to 15 wherein the network is a Time-Sensitive Networking, TSN, network, and the elimination procedure is performed as part of a Frame Replication and Elimination for Reliability, FRER, function of the receiving node (204).

Embodiment 17: The method of embodiment 16 wherein one or more parameters associated to the elimination procedure comprise a recovery sequence number parameter and a sequence history parameter.

Embodiment 18: The method of any one of embodiments 11 to 15 wherein the network is a Deterministic Networking, DetNet, network, and the elimination procedure is performed as part of a Packet Replication and Elimination Function, PREF, function of the receiving node (204).

Embodiment 19: The method of any one of embodiments 11 to 18 wherein the sequence indication is a sequence number.

Embodiment 20: The method of any one of embodiments 11 to 18 wherein the sequence indication is a timestamp.

Embodiment 21: A receiving node (204) that implements a redundancy mechanism based on sequence numbering or equivalent functionality, the receiving node (204) adapted to perform the method of any one of embodiments 1 to 20.

Those skilled in the art will recognize improvements and modifications to the embodiments of the present disclosure. All such improvements and modifications are considered within the scope of the concepts disclosed herein.

The invention claimed is:

1. A method performed by a receiving node that implements a redundancy mechanism based on sequence numbering or equivalent functionality, the method comprising:
   - receiving packets from a plurality of packet streams from a transmitting node via a network, wherein:
     - each packet stream of the plurality of packet streams is a replication of a particular packet stream;
     - the plurality of packet streams traverse separate paths from the transmitting node to the receiving node through the network; and each packet of each of the plurality of packet streams comprises a sequence indication that indicates a position of the packet within the particular packet stream;

performing an elimination procedure that processes each received packet to determine whether to discard the received packet or to accept the received packet, wherein performing the elimination procedure comprises:

while receiving the packets, resetting one or more parameters utilized by the elimination procedure responsive to an occurrence of an event; and responsive to resetting the one or more parameters utilized by the elimination procedure, discarding all of the received packets processed by the elimination procedure from a time at which the elimination procedure was reset until an end of a defined period of time.

2. The method of claim 1 wherein the defined period of time has a duration that is equal to or greater than a maximum path delay difference between any two paths traversed by the plurality of packet streams through the network.

3. The method of claim 1 wherein the defined period of time has a duration that is equal to a maximum path delay difference between any two paths traversed by the plurality of packet streams through the network.

4. The method of claim 1 wherein discarding received packets processed by the elimination procedure from the time at which the elimination procedure was reset until the end of the defined period of time comprises:

starting a timer that is set to a value that is equal to or greater than a maximum path delay difference between any two paths traversed by the plurality of packet streams through the network; and discarding received packets that are processed by the elimination procedure as long as the time is running.

5. The method of claim 1, wherein performing the elimination procedure further comprises accepting a first received packet after the end of the defined period.

6. The method of claim 1, wherein the network is a Time-Sensitive Networking, TSN, network, and the elimination procedure is performed as part of a Frame Replication and Elimination for Reliability, FRER, function of the receiving node.

7. The method of claim 6 wherein the one or more parameters that are reset comprise a recovery sequence number parameter and a sequence history parameter.

8. The method of claim 1, wherein the network is a Deterministic Networking, DetNet, network, and the elimination procedure is performed as part of a Packet Replication and Elimination Function, PREF, function of the receiving node.

9. The method of claim 1, wherein the sequence indication is a sequence number.

10. The method of claim 1, wherein the sequence indication is a timestamp.

11. A receiving node that implements a redundancy mechanism based on sequence numbering or equivalent functionality, the receiving node comprising:

a network interface; and processing circuitry associated with the network interface, the processing circuitry configured to cause the receiving node to:

receive packets from a plurality of packet streams from a transmitting node via a network, wherein:

each packet stream of the plurality of packet streams is a replication of a particular packet stream;

the plurality of packet streams traverse separate paths from the transmitting node to the receiving node through the network; and each packet of each of the plurality of packet streams comprises a sequence indication that indicates a position of the packet within the particular packet stream; and perform an elimination procedure that processes each received packet to determine whether to discard the received packet or to accept the received packet;

wherein in order to cause the receiving node to perform the elimination procedure, the processing circuitry is further configured to cause the receiving node to:

while receiving the packets, reset one or more parameters utilized by the elimination procedure responsive to an occurrence of an event; and responsive to resetting the one or more parameters utilized by the elimination procedure, discard all of the received packets processed by the elimination procedure from a time at which the elimination procedure was reset until an end of a defined period of time.

12. A method performed by a receiving node that implements a redundancy mechanism based on sequence numbering or equivalent functionality, the method comprising:

receiving packets from a plurality of packet streams from a transmitting node via a network, wherein:

each packet stream of the plurality of packet streams is a replication of a particular packet stream;

the plurality of packet streams traverse separate paths from the transmitting node to the receiving node through the network; and each packet of each of the plurality of packet streams comprises a sequence indication that indicates a position of the packet within the particular packet stream;

performing an elimination procedure that processes each received packet to determine whether to discard the received packet or to accept the received packet, wherein performing the elimination procedure comprises:

while receiving the packets, detecting an occurrence of a reset event; and responsive to detecting the reset event, performing one or more actions to discard or accept received packet (s), wherein the one or more actions are a function of a root-cause of the resetting.

13. The method of claim 12 wherein performing the one or more actions comprises:

determining the root-cause of the reset event;

determining whether the root-cause of the reset event is a begin event or initialization event;

responsive to determining that the root-cause of the reset event is a begin event or initialization event:

collecting and storing a first "n" of the received packets since the reset event;

selecting a packet from among the first "n" of the received packets with a latest sequence indication; and accepting the selected packet and discarding a remainder of the first "n" of the received packets.

14. The method of claim 12 wherein performing the one or more actions comprises:
- determining whether the root-cause of the reset event is a management event;
- responsive to determining that the root-cause of the reset event is a management event:
  - determining whether a first received packet since the reset event can be accepted; and
  - responsive to determining that the first received packet since the reset event can be accepted, accepting the first received packet.

15. The method of claim 14 wherein determining whether the first received packet since the reset event can be accepted comprises:
- preserving a plurality of sequence recovery related variables as they were before the reset event, the plurality of sequence recovery related variables comprising a history window and one or more parameters that indicate whether a packet with a particular sequence indication has already been received;
- determining whether the sequence indication of the first received packet is out of the predefined history window;
- if the first received packet is out of the history window, determining that the first received packet can be accepted; and
- if the first received packet is within of the history window:
  - determining whether the first received packet has already been received based on the one or more parameters that indicate whether a packet with a particular sequence indication has already been received;
  - if the first received packet has already been received, determining that the first received packet is to be discarded;
  - otherwise, determining that the first received packet is to be accepted.

16. The method of claim 12, wherein performing the one or more actions comprises:
- determining whether the root-cause of the reset event is a recovery timeout event;
- responsive to determining that the root-cause of the reset event is a recovery timeout event, accepting a first received packet since the reset event.

17. The method of claim 12, wherein the network is a Time-Sensitive Networking, TSN, network, and the elimination procedure is performed as part of a Frame Replication and Elimination for Reliability, FRER, function of the receiving node.

18. The method of claim 17 wherein one or more parameters associated to the elimination procedure comprise a recovery sequence number parameter and a sequence history parameter.

19. The method of claim 12, wherein the network is a Deterministic Networking, DetNet, network, and the elimination procedure is performed as part of a Packet Replication and Elimination Function, PREF, function of the receiving node.

20. The method of claim 12, wherein the sequence indication is a sequence number.

21. The method of claim 12, wherein the sequence indication is a timestamp.

22. A receiving node that implements a redundancy mechanism based on sequence numbering or equivalent functionality, the receiving node comprising:
- a network interface; and
- processing circuitry associated with the network interface, the processing circuitry configured to cause the receiving node to:
  - receive packets from a plurality of packet streams from a transmitting node via a network, wherein:
    - each packet stream of the plurality of packet streams is a replication of a particular packet stream;
    - the plurality of packet streams traverse separate paths from the transmitting node to the receiving node through the network; and
    - each packet of each of the plurality of packet streams comprises a sequence indication that indicates a position of the packet within the particular packet stream; and
  - perform an elimination procedure that processes each received packet to determine whether to discard the received packet or to accept the received packet;
- wherein in order to cause the receiving node to perform the elimination procedure, the processing circuitry is further configured to cause the receiving node to:
  - while receiving the packets, detect an occurrence of a reset event; and
  - responsive to detecting the reset event, perform one or more actions to discard or accept received packet(s), wherein the one or more actions are a function of a root-cause of the resetting.

* * * * *